Figure 4:
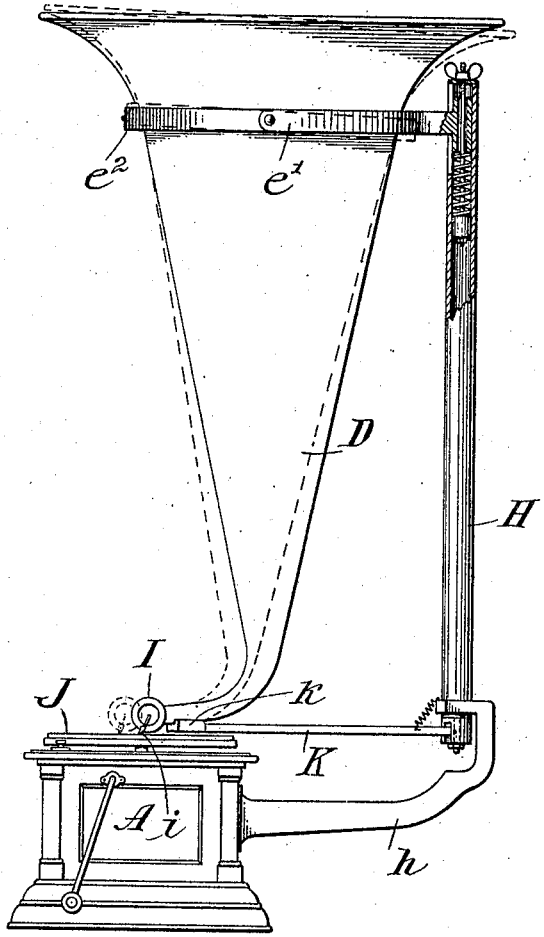

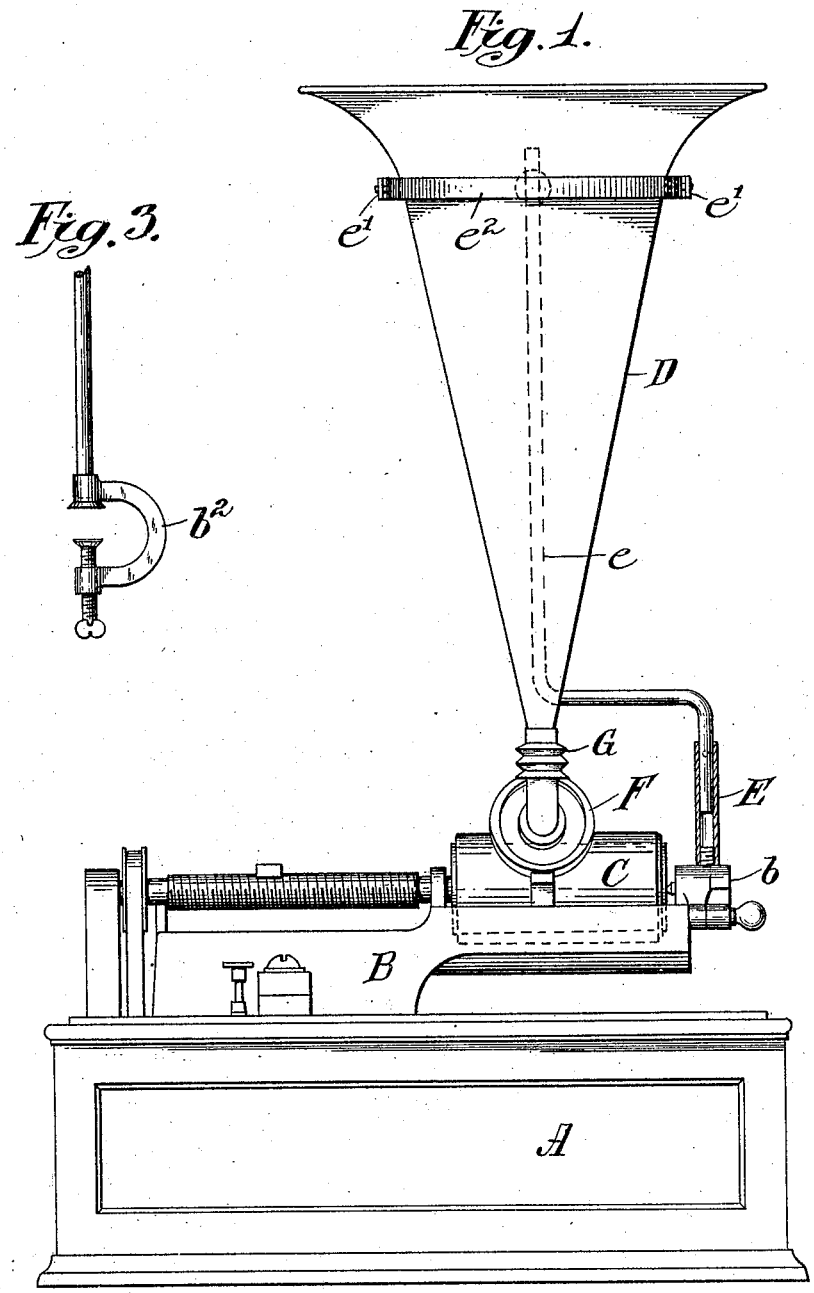

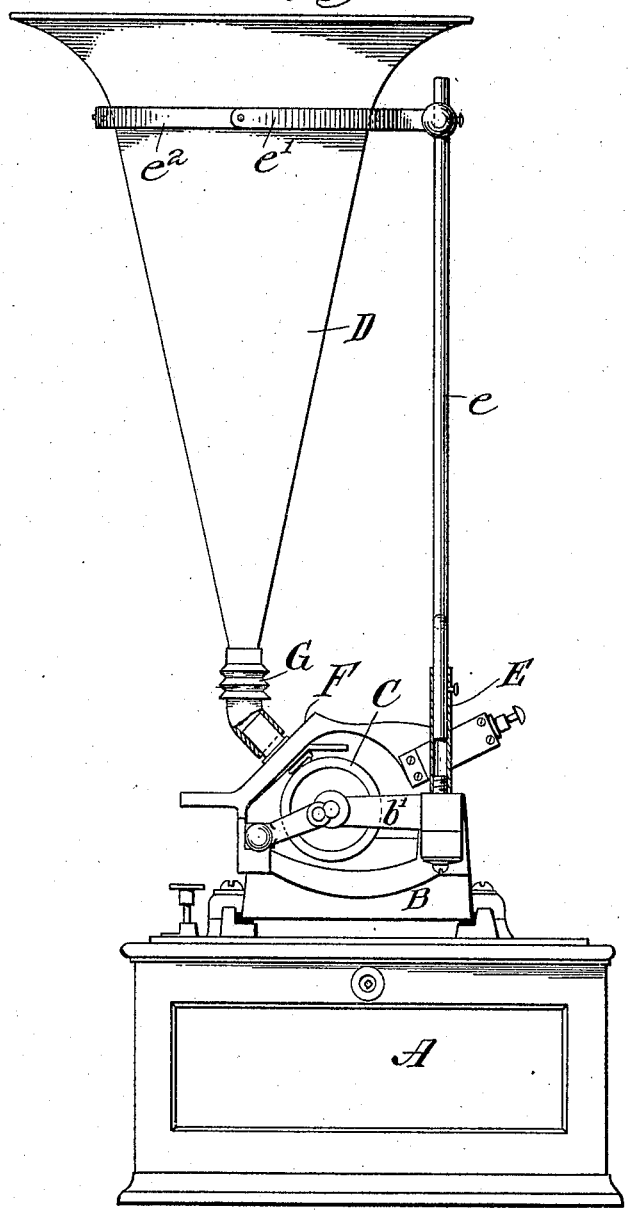

No. 806,289. PATENTED DEC. 5, 1905.
V. H. RAPKE.
TALKING MACHINE.
APPLICATION FILED FEB. 18, 1905.

5 SHEETS—SHEET 3.

Attest:
F. Alexander
W. B. Wardley

Inventor:
Victor H. Rapke
by F. W. Barker Atty.

No. 806,289. PATENTED DEC. 5, 1905.
V. H. RAPKE.
TALKING MACHINE.
APPLICATION FILED FEB. 18, 1905.

5 SHEETS—SHEET 4.

Attest:
F. Alexander
H. B. Hardley

Inventor:
Victor H. Rapke
by F. W. Parker Atty.

No. 806,289. PATENTED DEC. 5, 1905.
V. H. RAPKE.
TALKING MACHINE.
APPLICATION FILED FEB. 18, 1905.
5 SHEETS—SHEET 5.
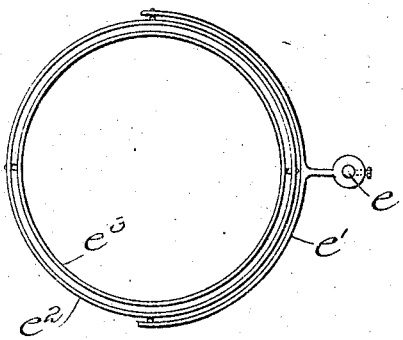
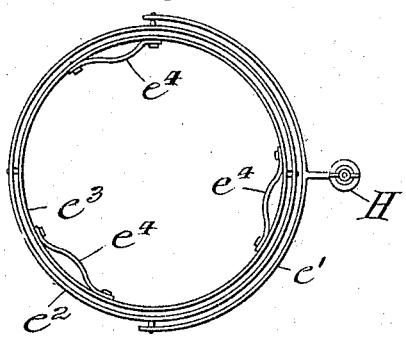
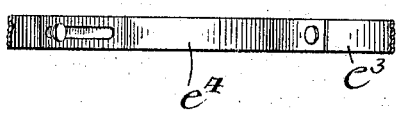
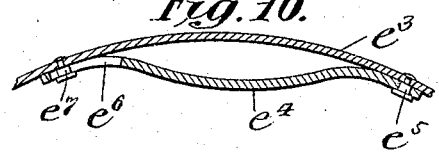
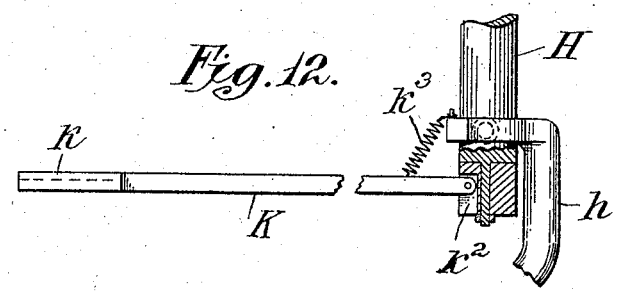
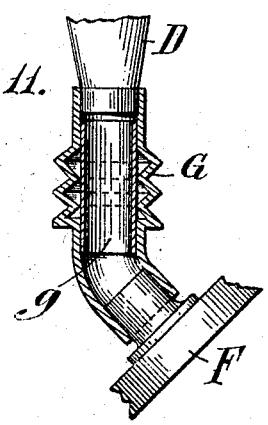
Attest:
F. Alexander
W B Wardley
Inventor:
Victor H. Rapke
by F. W. Parker Atty.

UNITED STATES PATENT OFFICE.

VICTOR H. RAPKE, OF NEW YORK, N. Y.

TALKING-MACHINE.

No. 806,289.　　　　Specification of Letters Patent.　　　　Patented Dec. 5, 1905.

Application filed February 18, 1905. Serial No. 246,229.

*To all whom it may concern:*

Be it known that I, VICTOR H. RAPKE, a citizen of the United States, residing at 1661 Second avenue, in the borough of Manhattan, in the city, county, and State of New York, have invented a new and useful Improvement in Talking-Machines, of which the following is a specification.

This device relates to that class of devices variously known as "phonographs" and "talking-machines;" and the objects of my improvements are to arrange the horns used with such instruments in a novel manner, whereby an improved result is attained, and to provide certain supporting and interconnecting devices to promote efficiency in the operation of the apparatus.

In the course of my experiments with machines of the above-noted character following endeavors to improve the quality of the sound reproductions therefrom I have discovered that by arranging the sound-magnifying horn in manner to discharge the sound-waves upwardly instead of following the usual practice of directing the horn toward the audience the result achieved is that a greatly-improved quality of sound finally reaches the audience.

The manner in which I account for the improved effect is that the sound-waves ascend to the ceiling of the room in which the machine is operated, which reflects said sound-waves downwardly as from a sounding-board, they being evenly diffused in their descent and losing that harshness incident to their delivery in a direct, and therefore more concentrated bombardment.

Furthermore, in prosecuting my endeavors to improve the operation of these devices I have devised means adapted for use with a record-making apparatus as well as with a reproducing-machine, whereby the contacting stylus may bear against the record with exactly that degree of pressure requisite to produce the best results, and whereby the effects of external or foreign vibrations are nullified.

With the above-noted objects in view the leading features of my invention may be briefly characterized as follows: first, the provision of means whereby a sound-magnifying horn may be supported in an approximately upright position from a phonograph or talking-machine; second, supporting means for a horn of a phonograph or talking-machine whereby such horn is sustained in an approximately upright position and is capable of universal movement in a horizontal plane at its lower end; third, in a phonograph, a hollow tubular connection between the horn and sound-box capable of yielding without imparting a tensional retarding influence to the sound-box in the horizontal movement of the latter; fourth, means for tensionally supporting a horn and attached sound-box from a talking-machine and adjustably counterbalancing the major portion of its weight; fifth, tensionally-supported means for guiding a suspended horn in its traverse over a disk; sixth, a connection between a horn and sound-box and guiding means therefor of a character avoiding the employment of joints and angles in the sound-passage.

Figure 5:
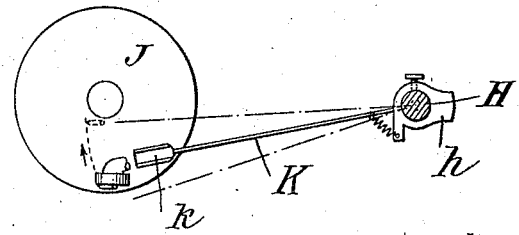
Figure 6:
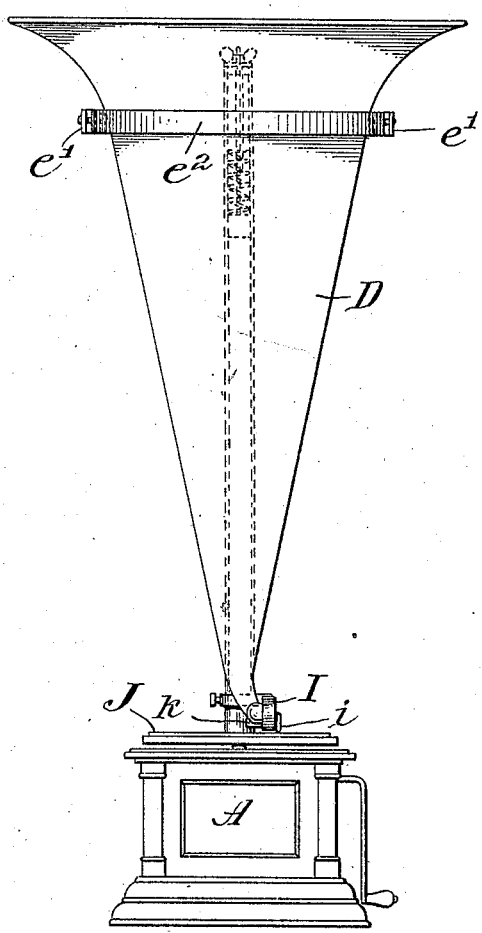

In the drawings accompanying this application, Figure 1 is a front view of a phonograph with a horn supported in an upright position. Fig. 2 is a side elevation thereof. Fig. 3 is a detail of a horn-supporting bracket. Fig. 4 is a side view of a disk-machine with a horn supported in an upright position. Fig. 5 is a plan view of the disk thereof, showing diagrammatically the course of the stylus thereover. Fig. 6 is a front view of Fig. 4. Fig. 7 is a detail plan view of the universal support for the horn. Fig. 8 is a similar view showing the adjustable contacts. Figs. 9 and 10 are respectively side and plan views of said adjustable contacts. Fig. 11 is a detail of a flexible hollow coupling between a horn and sound-box. Fig. 12 is a detail of a tensional guide for a horn.

In Figs. 1, 2, and 3 I have illustrated my invention as applied to the support of a horn for a phonograph, and I will first describe the parts used in connection therewith. In said views the letter A indicates the case of the phonograph, B the frame which supports the cylindrical record C in the usual manner, and D the sound-magnifying horn. In order that the horn may be supported in an approximately upright position above the record and rendered capable of universal movement in a substantially horizontal plane at its lower end, I provide sustaining means as follows: E indicates a hollow post which extends upwardly from the frame B or from some other rigid portion of the apparatus. In the example indicated it is seen as entered within the boss *b* in place of the usual pivot used for the gate *b'* and for convenience serving the function of such pivot. It may, however, be connected to a bracket, as $b^2$, which can be conveniently attached to the frame B. Entered within the hollow post E is a rod $e$, that extends upwardly therefrom and is capable of adjustment vertically, whereby the height of said rod may be regulated. Projecting horizontally from said rod $e$ at its upper end is a semicircular member $e'$, within which is pivotally mounted a ring $e^2$, while an inner ring $e^3$ is pivoted within the ring $e^2$, as seen. Sufficient clearance exists between the rings $e^2$ $e^3$ and the semicircular support $e'$ to permit said rings to swing vertically and independently. By this means an upright body supported within the inner ring is capable of universal movement, as is evident.

The assemblage of rings and their external pivotal supports referred to comprises what I term a "universal support," and it is disposed and held above the record substantially in the vertical line thereof, whereby when the horn, as D, is introduced within the inner ring $e^3$ it by means of an upper enlarged portion of the wall of said horn rests within said ring, and its lower contracted end, to which the sound-box F is attached, is held in suitable position with relation to the cylinder C, whereby the reproducing-stylus $f$, that extends from said sound-box, is in contact with the cylinder.

In order that horns of different sizes may be accommodated with and held by the support aforesaid, I place three or more bowed spring-like pieces $e^4$ at equidistant points within the ring $e^3$, said pieces being secured at one end, as by rivets $e^5$, and at their opposite ends having slots $e^6$, by which they may slide upon studs $e^7$. The tension of the pieces $e^4$ enables them to stand out to support a horn of relatively small diameter, while they may be contracted in receiving a larger horn.

As the stylus $f$ travels from end to end of the cylinder C, it is necessary that means be provided permitting the stylus to maintain its contact with the cylinder when the horn is moved out of its upright position, because in such movement a rigid terminal point of the horn would describe an arc causing the stylus to leave the surface of the cylinder. Hence I have provided, as a connection between the horn and the sound-box, a flexible hollow coupling, as G, this coupling possessing the function of flexibility in a mechanical manner instead of as an inherent quality of the material employed. Thus I have shown the coupling G as composed of a corrugated or bellows-like tube of flexible material, whose wall is capable of expanding and contracting without stretch of the material of which the coupling is composed. Should an ordinary rubber tube be employed in place of this bellows device, the material thereof would contract at one side while expanding at its opposite side when swaying tangentially to its normal axis, and the tension or resistance thereby set up would be imparted to the contact between the stylus and the cylinder, thereby interfering with the correct translation of the sound-vibrations in process.

In order to avoid the danger of interference with the quality of the sound-waves passing through the hollow coupling G through the presentation of the broken or corrugated surface of the bellows-like formation, I may provide a section of straight flexible tubing, as $g$, which is slidably inserted within said coupling, as seen, and which forms a passage having an unbroken wall while being capable of yielding in consonance with the movements given the bellows without exerting any dragging or retarding effect.

In adapting my improvements for use in conjunction with a disk-machine, wherein it is necessary to provide different means controlling the movement of the horn with relation to the record, because with this style of instrument the sound-box is carried by the horn, I have found it desirable to provide means while supporting the horn in an upright position to counterpoise the major part of the weight of the horn, thereby regulating to a nicety the degree of weight with which the reproducing-stylus bears against the disk. I have also found it necessary with this style of apparatus to provide means compensating for the undulatory movement of the disk while rotating to avoid changes in the degree of contact of the stylus with the record while the latter is moving under the former in the aforesaid undulatory or wave-like fashion.

I have, further, found it necessary to provide means enabling the reproducing-stylus, while moving radially with respect to the disk, to maintain an even contact therewith in describing the arc incident to the pivotal manner in which the horn is supported above the disk.

In carrying out these improvements I provide a hollow standard, as H, which is supported from the case as by a bracket-arm $h$ or otherwise in a suitable manner and from which my aforesaid universal support extends horizontally. In this instance the universal support is connected with a slide, as $h'$, which is located within the hollow standard H, the latter acting as a slideway therefor. The slide $h'$ is supported by a coiled spring $h^2$, which is located within the hollow standard H and mounted upon a stop, as $h^3$. A threaded stem $h^4$, having a thumb-nut $h^5$, serves to adjust the tension of the spring. In this manner the spring $h^2$ may be tensionally adjusted to the requisite degree for supporting the weight of the horn, which is mounted in the universal support aforesaid, thereby enabling the lower end of the horn having the sound-box I and stylus $i$ to rest upon the disk J with just that degree of pressure which is desirable. A guide-arm K is pivotally connected at one end to the standard H and at its opposite end is provided with a seat for the horn. By means of this guide-arm the oscillatory movement of the horn and reproducing-stylus with respect to the disk is limited to an arc concentric with the pivotal connection between the guide-arm K and the standard H. The course of the stylus in traversing the disk J is clearly shown in Fig. 5. When the needle is following this course, the horn, which is in a substantially upright position, the needle being at an outer point upon the disk, would sway upwardly, causing the stylus-point to leave the disk in describing an upward arc. Therefore I preferably incline the horn (somewhat in the manner indicated in dotted lines in Fig. 4) when the stylus is upon the starting or outer point upon the disk. Therefore as the horn sways, causing the stylus to travel inwardly, it also tends to assume a vertical position, (shown in full lines in Fig. 4,) this tendency enabling the stylus to maintain contact with the disk throughout its entire course across the disk.

In the practice of these instruments the disk J while rotating undulates or has a wave-like up-and-down motion. Hence if the horn were supported rigidly the stylus would exert pressure upon the disk with a varied degree of force in consequence of the presentation to it of the moving disk-surface in a series of different horizontal planes, or if this undulatory movement were excessive the disk-surface would intermittently make contact with and leave the point of the stylus. By reason of the tensional support given the horn, however, the stylus is thereby yieldingly supported upon the disk and is enabled to rise and fall with the corresponding undulatory movement of the disk in this rotation.

The arm K is pivoted, as at $k'$, to a collar $k^2$, that is rotatably supported by the standard H, said arm K being tensionally supported in contact with the under side of the horn. This tensional support consists of a spiral spring $k^3$, connected at one end with the upper surface of arm K near its fulcrum, and the other end of said spring being fastened to the bracket $h$ or to some rigid point tangentially above the arm K in manner to exert an upward and sidewise tension to draw said arm (and with it the horn and stylus) toward the outer or starting point of the disk.

The sidewise tension referred to is of a moderate character, it being only required to swing the horn clear of the record on the disk when said horn has been moved to free the stylus from contact therewith, the main purpose of this exercise of spring tension being to prevent the horn from accidentally swinging inwardly when the instrument is not in use, as in such act the stylus might injure the record.

As before stated, the tension of the spring $k^3$ may be varied, whereby said spring forms a cushion capable of exactly absorbing all foreign vibrations or jars, which would otherwise cause the stylus to rebound sharply and create a false sound.

As will be observed by a reference to Figs. 4 and 6, the horn there shown is connected with the sound-box without the intervention of any movable parts, and the sound-passage, starting from the diaphragm to the outlet, is devoid of sharp angles, all of which tend to break up the sound-waves and detract from that purity of emitted sound which is so desirable. In my improved apparatus aforesaid there is no joint in the passage, and but a single gradual curve exists in the lower end of the horn, near its point of connection with the sound-box. This peculiar construction is largely responsible in the attainment of the perfect results developed by this machine.

Having described my invention, I now declare that what I claim is—

1. In a phonograph or talking-machine, a frame therefor, a standard extending upwardly therefrom, a universal support extending horizontally from said standard, and a horn sustained in an upright position from said support.

2. In a phonograph or talking-machine, a frame therefor, a standard extending upwardly therefrom, a universal support extending horizontally from said standard, a tensional device between said standard and support, and a horn sustained in an upright position from said support.

3. In a phonograph or talking-machine, means sustaining the horn thereof in an upright position, said means comprising a number of concentric members, separately pivoted in manner to allow the universal movement of the horn horizontally.

4. In a phonograph or talking-machine, means pivotally supporting the horn thereof near its outer end, and a hollow connection between the contracted end of said horn and the sound-box, characterized by the ability to yield with the movement of the sound-box without exercising tension between the united members.

5. In a phonograph or talking-machine, means pivotally supporting the horn thereof near its outer end and a hollow, flexible, bellows-like connection between the horn and sound-box.

6. In a phonograph or talking-machine, means pivotally supporting the horn thereof near its outer end, a hollow, flexible, bellows-like connection between the horn and sound-box, and a straight flexible tube slidably fitted within said connection.

7. In a talking-machine, a vertically-disposed horn therefor having a sound-box at its contracted end, and tensionally-held means to guide said sound-box over the record.

8. In a talking-machine, a vertically-disposed horn therefor having a sound-box at its contracted end, tensionally-held means to guide said sound-box over the record, and tensional means to retract said sound-box when it has completed its traverse over the record.

9. In a talking-machine, a vertically-disposed horn therefor having its lower end curved laterally, and a sound-box attached thereto, together with a guide-arm, pivoted to swing horizontally, and bearing tensionally against the under surface of said lower end of the horn, to guide the sound-box over the record.

VICTOR H. RAPKE.

Witnesses:
F. W. BARKER,
R. A. ETHERSON.